(12) United States Patent
Ben Shoshan et al.

(10) Patent No.: US 6,670,986 B1
(45) Date of Patent: Dec. 30, 2003

(54) APPARATUS FOR ORTHOGONAL MOVEMENT OF A CCD SENSOR AND A METHOD OF LIGHT SAMPLING THEREWITH

(75) Inventors: Joseph Ben Shoshan, Raanana (IL); Stanley Barkan, Hof Hacarmel (IL); Moshe Yannai, Caesaria (IL); Marcelo Wiersch, Holon (IL)

(73) Assignee: Creo IL. Ltd., Herzlia (IL)

( * ) Notice: Subject to any disclaimer, the term of this patent is extended or adjusted under 35 U.S.C. 154(b) by 0 days.

(21) Appl. No.: 09/301,548

(22) Filed: Apr. 29, 1999

(30) Foreign Application Priority Data

Sep. 10, 1998 (IL) .................................................. 126165

(51) Int. Cl.⁷ .......................... H04N 5/225; G03B 17/04
(52) U.S. Cl. ........................ 348/219; 348/374; 396/341
(58) Field of Search ..................... 348/219.1, 373–376; 396/341–347

(56) References Cited

U.S. PATENT DOCUMENTS

| 4,803,557 | A | * | 2/1989 | Bridges ....................... 348/374 |
| 4,947,239 | A | | 8/1990 | Kondou et al. |
| 5,214,513 | A | * | 5/1993 | Lee ......................... 348/207.99 |
| 5,270,534 | A | * | 12/1993 | Huiberts et al. ............. 250/216 |
| 5,557,329 | A | * | 9/1996 | Lim .............................. 348/374 |
| 5,640,207 | A | * | 6/1997 | Rahmouni et al. .......... 348/374 |
| 6,243,136 | B1 | * | 6/2001 | Sasaki ...................... 348/230.1 |
| 6,426,773 | B1 | * | 7/2002 | Suzuki ........................ 348/373 |

FOREIGN PATENT DOCUMENTS

| EP | 0396687 | 6/1995 |
| JP | 56153693 A2 | 11/1981 |
| JP | 61098073 | 5/1986 |
| JP | 06189318 | 7/1994 |

* cited by examiner

*Primary Examiner*—Andrew Christensen
*Assistant Examiner*—Nhan Tran
(74) *Attorney, Agent, or Firm*—Eitan, Pearl, Latzer & Cohen Zedek, LLP (57) ABSTRACT

Apparatus for the orthogonal (X,Y) movement which allows high-resolution color photography in both the X and Y directions, by micro-movement of the CCD sensor within a digital camera body is provided which can be used together with a rotatable mount for rotating the CCD sensor from portrait mode to landscape mode, without needing to rotate the camera base.

11 Claims, 7 Drawing Sheets

R - Red Pixel

G - Green Pixel

B - Blue Pixel

FIG. 1

(Prior Art)

APPARATUS FOR ORTHOGONAL MOVEMENT OF A CCD SENSOR AND A METHOD OF LIGHT SAMPLING THEREWITH

CROSS REFERENCE TO RELATED APPLICATIONS

This application claims priority from Israeli Patent Application No. 126165, entitled "Apparatus For The Orthoganol Movement of a CCD Sensor" filed on Sep. 10, 1998, incorporated herein by reference.

FIELD OF THE INVENTION

The present invention relates to digital cameras in general and in particular to the movement of CCD sensors within digital cameras.

BACKGROUND OF THE INVENTION

One of the main problems associated with digital cameras is obtaining a sufficiently high resolution. This problem is amplified with color cameras, having color CCD sensors, such as the Leaf Catchlight digital camera, manufactured by Scitex Corp., Herzlia, Israel. The benefit of using a color CCD, is the option of taking one-shot pictures, such that a moving object might be photographed too.

Figure 1:
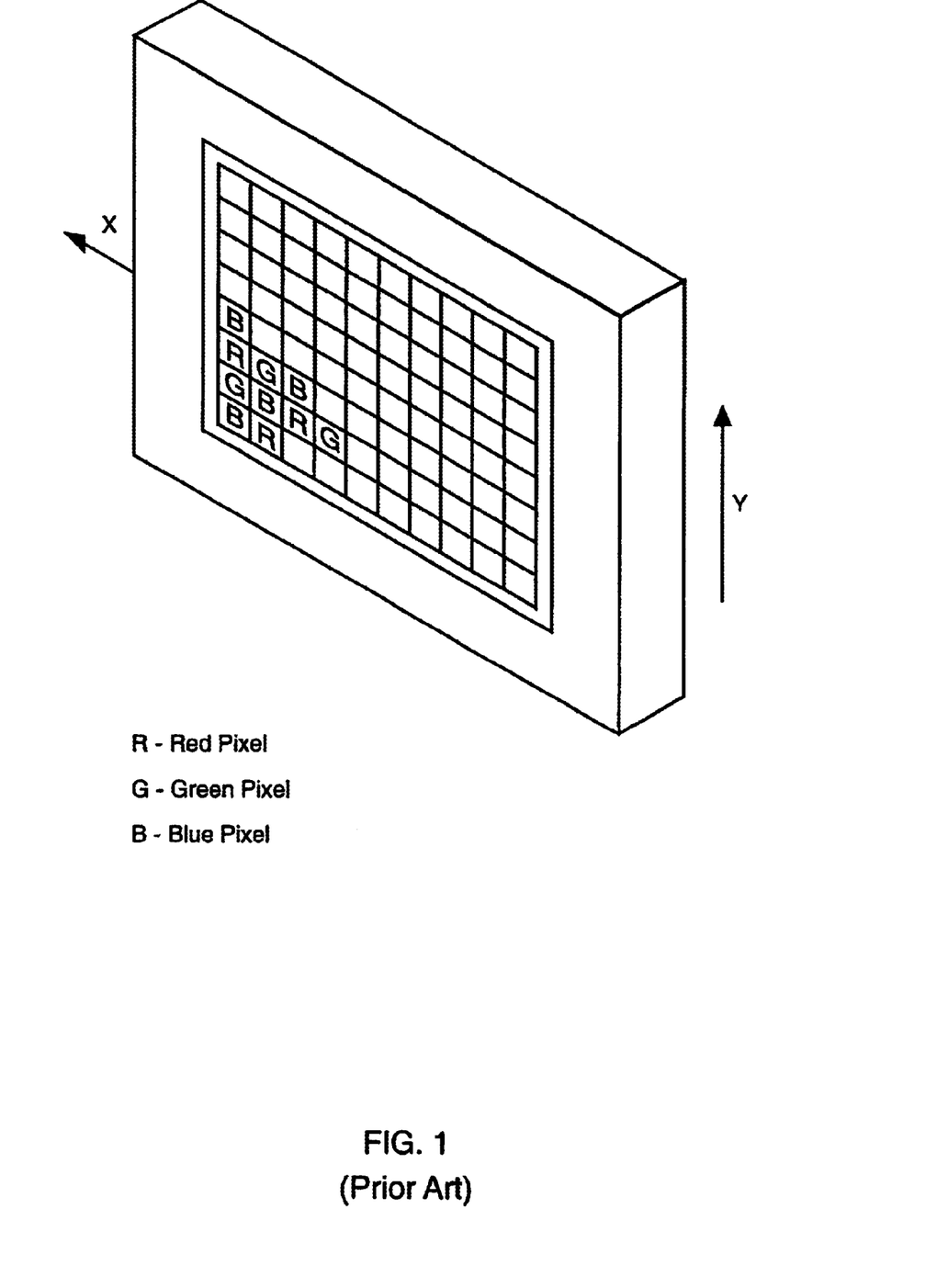
FIG. 1 schematically illustrates the pixel arrangement of a color CCD sensor.

FIG. 1 schematically illustrates the pixel arrangement of a color CCD sensor. In the color CCD sensor, one third of the pixels are green (referenced G), one third are blue (referenced B) and one third are red (referenced R), thus the total resolution is one third.

Various methods for increasing the resolution have been developed over the past few years. One method is based on a filter-wheel, which is placed in front of the CCD sensor and requires three shots for each picture; one shot for each base-color. An example of such a device is the Leaf DCB-2 digital camera, manufactured by Scitex Corp., Herzlia, Israel.

Another method consists of three CCDs with dichroitic mirrors in front. All three CCDs view the same picture, thus increasing the resolution by factor of three. An example of such a device is the Smart Scanner head, manufactured by Scitex Corp., Herzlia, Israel.

Figure 2:
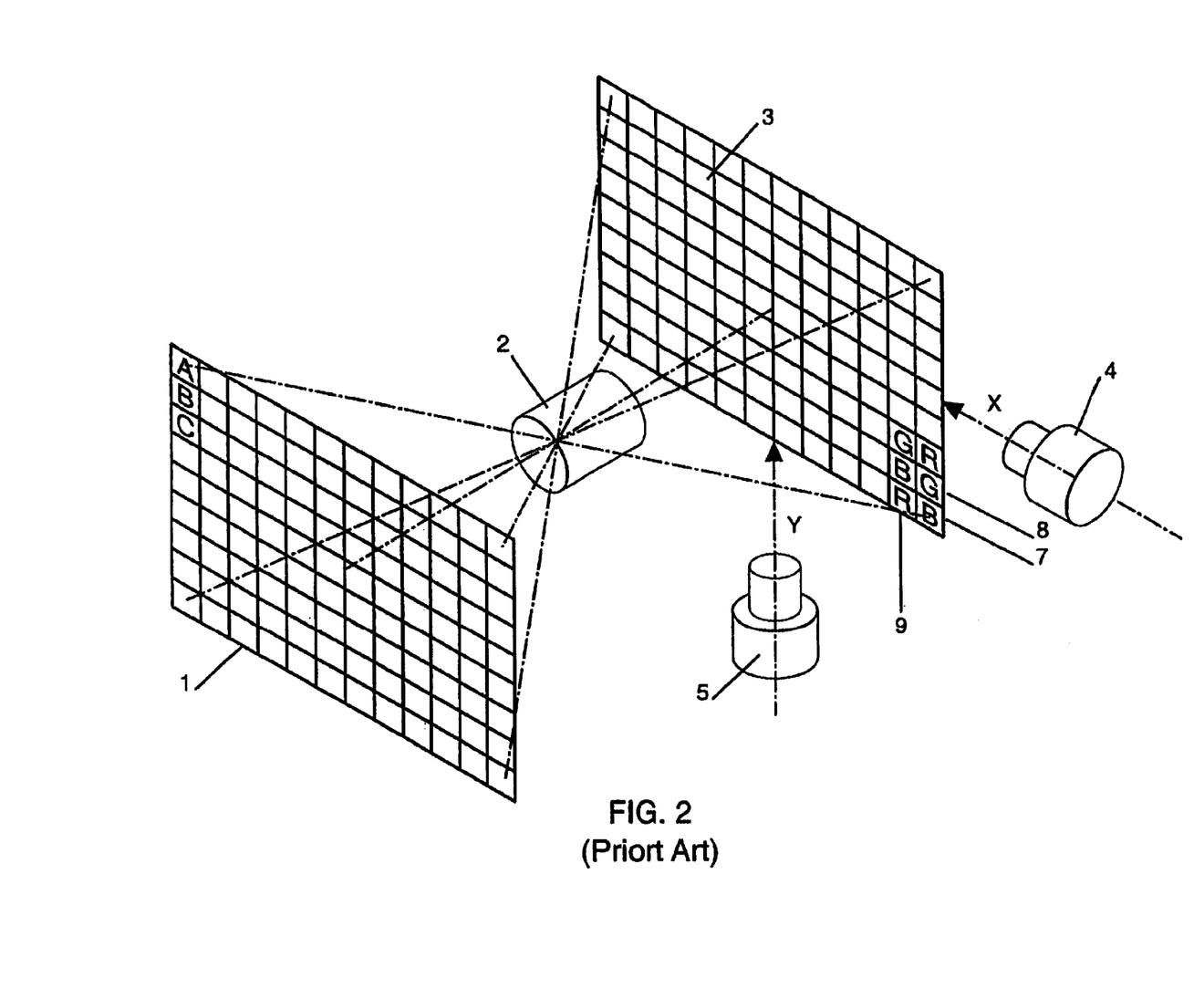
FIG. 2 schematically illustrates the use of an X-Y stage.

A third method is based on a color CCD sensor, as described in FIG. 1, which is placed on an X-Y piezoelectric driven stage. Reference is now made to FIG. 2, which schematically illustrates the use of an X-Y stage. Generally, a pixel, for example pixel "A", of an object 1, when viewed via the camera lens 2, is inverted by the lens 2 and is sensed by CCD sensor 3 in the position 7 indicated by B (blue) sensing pixel of sensor 3. The X-Y stage of the piezoelectric driver is schematically shown by elements 4 and 5 respectively. When the piezoelectric driver 5, for example, moves the sensor one pixel in the Y direction, pixel "A" will 'fall' on pixel G (green) of the sensor 3, indicated 8, instead of pixel B (blue). Thus, the color of pixel "A" is sensed by a sensor pixel having another color (say green). Similarly, when driver 4 moves the sensor in the X direction, the viewed pixel "A"'falls' on a pixel of another color R (red) indicated 9. Thus, by taking three shots of each pixel, each pixel is photographed in its three basic colors (R, G and B). An example of such a device is the Carnival digital camera, manufactured by Scanview of Denmark.

EP Patent 0396687 to Lenz, describes the use of separate piezo-actuators for shifting an image in the X and Y directions between individual frame pickups, relative to a CCD junction detector, so that at least three color separations are positioned in succession at the same picture position.

Unfortunately, all the above methods are either expensive and/or complicated to manufacture.

Figure 3:
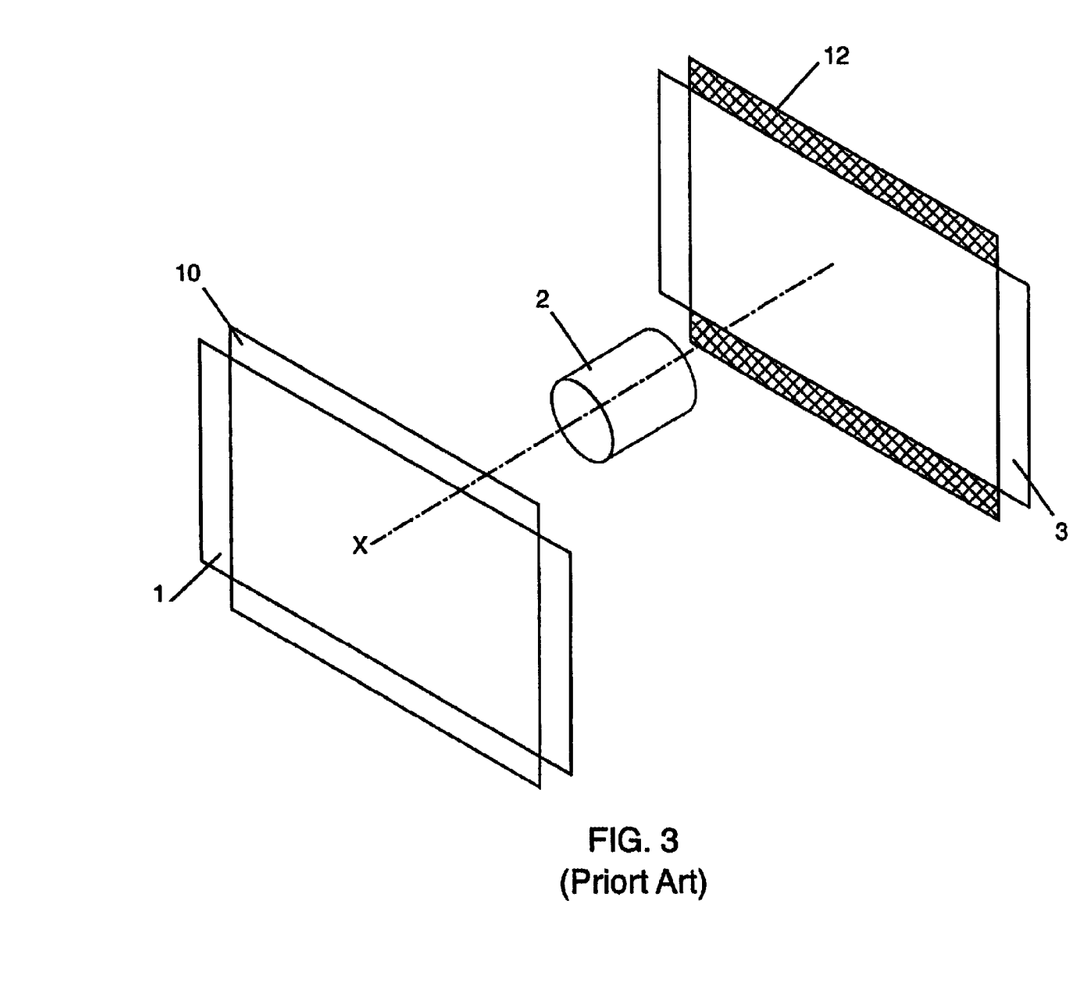
FIG. 3 illustrates the loss of information, which occurs when a prior-art camera is rotated by 90.

Present day still cameras utilize a fixed CCD sensor. For example, the Ftf 3020 color camera, manufactured by Philips of the Netherlands, which uses a rectangular CCD having 2000 pixels in height×3000 pixels in width. Cameras having such rectangular CCD have a major disadvantage when photographing a vertical picture. Since the orientation of the picture and the sensor are perpendicular to each other, there is loss of information. This is illustrated in FIG. 3, to which reference is now made.

A horizontal object 1 viewed by a camera lens 2, 'falls' completely on the CCD sensor 3. However, when a vertical object, referenced 10, is viewed, only part of the object 10 'falls' on the CCD sensor 3, while other parts of the object, indicated by dashed lines 12, are 'lost'.

To overcome this problem, the camera is usually rotated 90, by rotating the base (seating the camera on a conventional tripod, for example). However, rotating the camera base causes misalignment of the camera vis-a-vis the picture being viewed. Usually, the misalignment is corrected by re-adjusting the stand. This procedure is time-consuming and inconvenient.

SUMMARY OF THE INVENTION

The present invention provides apparatus for moving a CCD sensor in the X-Y direction, which overcomes the limitations and disadvantages of the prior art.

The present invention further provides orthogonal X-Y movement apparatus, which allows high-resolution color photography in both the X and Y directions, by micro-movement of the CCD sensor.

The present invention further uses a specific arrangement of the three colors on the CCD sensor, thus providing, in conjunction with the suggested micro-movement of the CCD sensor, a sampling sequence that is optimal for use in a digital camera that may alternately serve as one-shot or three-shot camera.

The present invention in addition provides a rotatable mount for rotating a CCD sensor within a pre-determined degree of limitation from a first position to a second position, such as 90 degrees from portrait mode to landscape mode, without needing to rotate the camera base and consequent misalignment of the camera. The rotatable mount can be used together with the orthogonal X-Y apparatus.

There is thus provided, in accordance with a preferred embodiment of the present invention, apparatus for the orthogonal (X,Y) movement of a CCD sensor within a digital camera body which includes a CCD plate to which the CCD sensor is connected, a linear actuator for providing movement in orthogonal X,Y directions to the CCD plate, the linear actuator having a first axis disposed at 45 degrees to the X and Y directions, and means for transferring movement between the linear actuator and the CCD plate.

Furthermore, in accordance with the preferred embodiment of the resent invention, the apparatus further includes a base plate connected to the camera body and wire springs connecting the base plate to the CCD plate.

Furthermore, in accordance with a preferred embodiment of the present invention, the means for transferring movement includes a movable member attached to the linear actuator, the actuation of the linear actuator causing the movable member to move either backwards or forwards along the first axis.

In addition, in accordance with a preferred embodiment of the present invention, the means for transferring movement further includes first and second rotatable eccentric arms supported by corresponding first and second support rods, respectively, the first and second rotatable eccentric arms being in contact with the CCD plate; and first and second rods, each of the first and second rods having a proximate and a distal end, wherein the distal end of each of the first and second rods is attached to the first and second eccentric arms, respectively, wherein the proximal end of each of the first and second rods is in contact with the movable member, and wherein the proximal end of each of the first and second rods is slidably retained by the base plate.

The transferring movement means also includes rotatable annuluses fitted to the first and second eccentric arms; and rotating bearings attached to the CCD plate, the rotating bearings in contiguous contact with the rotatable annuluses to reduce friction between the first and second eccentric arms and the CCD plate.

Furthermore, in accordance with a preferred embodiment of the present invention, the first and second rods are in contiguous contact with opposite ends of the movable member; the first rod being positioned behind the movable member proximate to one end of the movable member, and the second rod being positioned in front of the movable member proximate to the other end of the movable member.

Furthermore, in accordance with a preferred embodiment of the present invention, the apparatus further includes first and second restraining plates; each of the first and second restraining plates being attached at a first end to the base plate, and first and second springs attached to the CCD plate and the first and second restraining plates. The first restraining plate and the first springs act together to resist movement in the "X"-direction and the second restraining plate and the second springs act together to resist movement in the "Y"-direction.

In addition, there is provided, in accordance with a preferred embodiment of the present invention a rotatable mount for rotating a CCD sensor within a pre-determined degree of limitation from a first position to a second position. The rotatable mount supported by a CCD plate for retaining the CCD sensor, a shaft connected to the rotatable mount and adjustment means attached to the shaft for rotating the CCD plate within a pre-determined degree of limitation. The rotatable mount allows the plate to be moved through 90 degrees without the need to adjust the camera base.

Furthermore, in accordance with a preferred embodiment of the present invention, the rotatable mount is supported by means of a plurality of bearings within the CCD plate.

Furthermore, in accordance with a preferred embodiment of the present invention, the rotatable mount further includes a friction ring attached to the shaft for retaining the rotatable mount in position.

Furthermore, in accordance with a preferred embodiment of the present invention, the mount may be rotated either manually using a handle or by a motor.

In addition, there is also provided, in accordance with a preferred embodiment of the present invention, a method for sampling the light image from a CCD sensor in a digital camera, having a color filter array. The method includes the steps of:

sampling a first color component in a first position of the CCD sensor;

moving the CCD sensor along a first axis to a second position;

sampling the color component in the second position;

moving the CCD sensor along the first axis back to the first position;

moving the CCD sensor along a second axis to a third position, the second axis being perpendicular to the first axis;

sampling the color component in the third position; and moving the CCD sensor along the second axis, back to the first position.

Furthermore, in accordance with a preferred embodiment of the present invention, the color filter array includes equal resolution for all color channels. Alternatively, the color filter array includes one higher resolution color channel. The higher resolution color channel may be green.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 4:
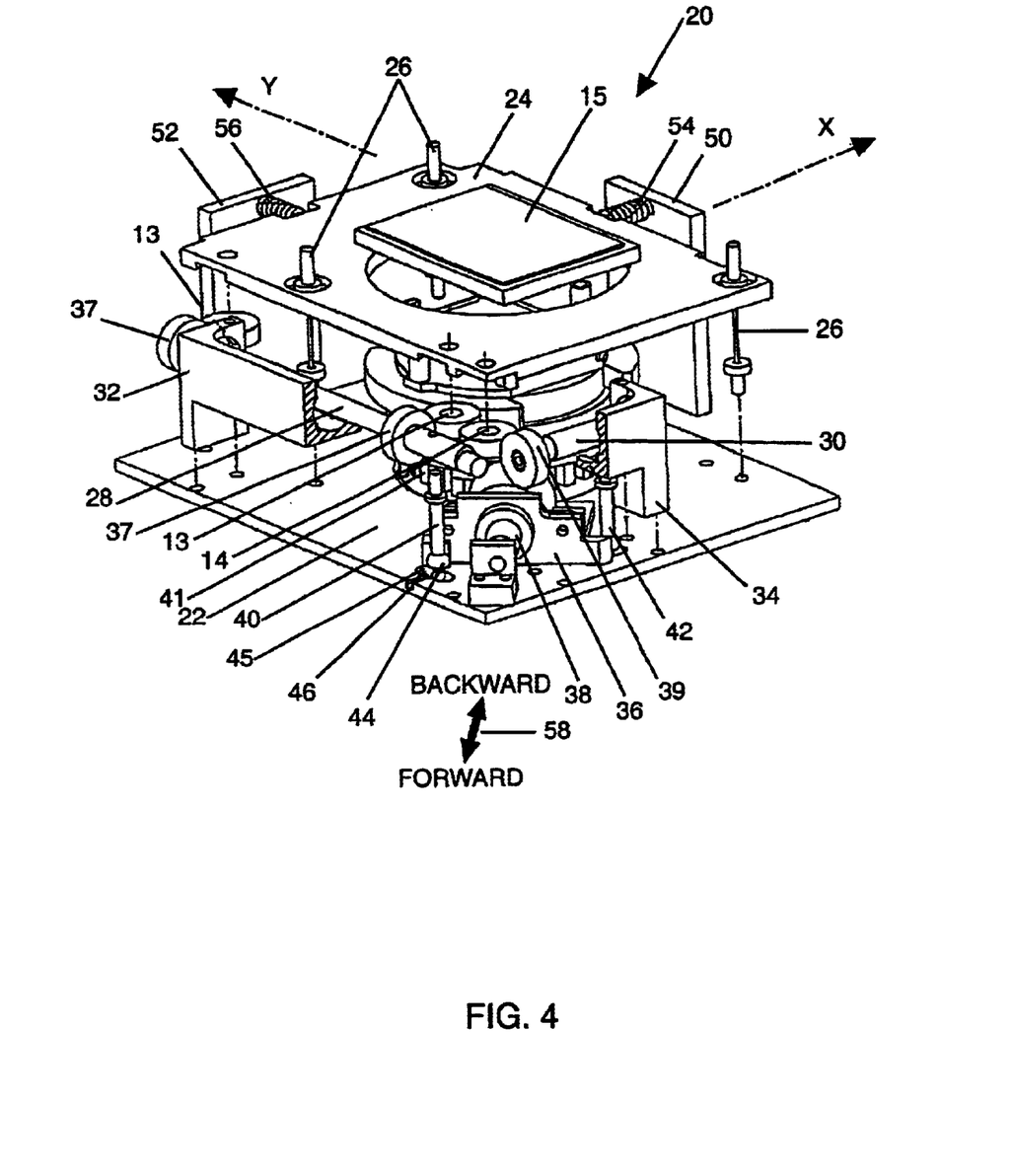
FIG. 4 is a partially cut-away, isometric view of an X-Y movement apparatus, constructed and operative according to a preferred embodiment of the present invention.

Reference is now made to FIG. 4, which is a partially cut-away, partially exploded, isometric view of a bi-dimensional (X-Y) movement apparatus, generally designated 20, constructed and operative according to a preferred embodiment of the present invention. The X-Y movement apparatus 20 comprises a base plate 22 for fixing to the camera body (not shown), a CCD plate 24 to which the CCD sensor 15 is attached and a plurality of wire springs 26 connecting base plate 22 to CCD plate 24. The wire springs 26 allow the CCD plate 24 to "float" over plate 22 in both the X and Y directions.

The X-Y movement apparatus of the present invention is characterized by movement means which comprises a linear actuator 38, for example, model HSI26000 made by HIS Inc, USA, or similar device, and a movable shovel member 36 which is attached to the linear actuator 38. Linear actuator 38 is preferably located proximate to one corner of the base plate 22 and the shovel member 36 is disposed perpendicularly to the axes of the linear actuator 38, so that the actuation of linear actuator 38 causes shovel member 36 to move backwards or forwards diagonally across the base plate 22.

The X-Y movement apparatus further comprises first and second rotatable eccentric arms 28 and 30 supported by members 32 and 34, respectively, and first and second rods 40 and 42, respectively, which are suitably attached at their distal ends 41 to first and second eccentric arms 28 and 30, respectively. First and second rotatable eccentric arms 28 and 30 are in contact with CCD plate 24 via annulus 37 for arm 28, and annulus 39 for arm 30. The matching bearings attached to plate 24 are referenced no. 13 and 14 while first and second rods 40 and 42 are in contact with the movable shovel member 36.

First and second rods 40 and 42, respectively, are located so as to be in contiguous contact with opposite ends of shovel member 36; first rod 40 being positioned so as to be behind shovel member 36 whereas second rod 42 is positioned to be in front of shovel member 36.

Support members 32 and 34 extend from the base plate 22 to which they are suitably attached. To reduce wear due to friction, first and second eccentric arms 28 and 30, respectively, are supported via bearings not shown to allow the first and second eccentric arms 28 and 30 to freely rotate. A rotatable annulus 37 is fitted to first eccentric arm 28 and similarly a second rotatable annulus 39 is fitted to second eccentric arm 30. Rotating bearings 13 and 14 are attached to plate 24 and located so as to be in contiguous contact with rotatable annulus 37 and annulus 39, respectively, to reduce friction between the first and second eccentric arms 28 and 30 and the plate 24. Thus, the minute movement of the actuator is transferred to the CCD plate 24 via the rotating annuluses 37, 39 and bearings 13, 14.

An indentation 44 is formed within base plate 22 to retain the proximate end 45 of first rod 40. A spring 46 is located within base plate 22 and is positioned in contiguous contact with the proximate end 45 of first rod 40. Similarly, a second indentation 48 (not clearly visible) is formed within base plate 22 to retain the proximate end of second rod 42. A spring (not shown, similar to screw 46) is located within base plate 22 and is positioned to be contiguous contact with the proximate end of second rod 42. The springs act to return the eccentric arms 28, 30 to their respective original positions when the direction of movement of the linear actuator is changed.

The X-Y movement apparatus 20 further comprises first and second restraining plates 50 and 52. The first restraining plate 50 is attached at one end to base plate 22 and at it's other end by a spring 54 to CCD plate 24. First restraining plate 50 and spring 54 act together to resist movement in the "X"-direction. Similarly, second restraining plate 52, which is attached at one end to base plate 22 and at it's other end by a spring 56 to CCD plate 24, resists movement in the "Y"-direction. Springs 54 and 56 push plate 24, against first and second eccentric arms 28 and 30, respectively, via the respective bearings.

In operation, the actuator 38 can be moved either backwards or forwards (schematically indicated by arrow 58 which is parallel to diagonal of plate 22). When the actuator 38 is activated forwards, the shovel 36 pushes first rod 40, attached to first eccentric arm 28, thus causing first eccentric arm 28 to rotate and push CCD plate 24 in the X-direction against spring 54.

When the actuator 38 is activated backwards, the spring 54 returns plate 24 to its original position, and spring 46 returns the first eccentric arm 28 to its original position. Continued activation of the shovel 36 backwards pushes second rod 42, attached to second eccentric arm 30, thus causing second eccentric arm 30 to rotate and push CCD plate 24 in the Y-direction against spring 56.

The eccentricity of the arms 28 and 30 connected to rods 40 and 42 respectively, and the length of rods 40 and 42, produce a high transmission ratio and thus allow for micro movement of the CCD plate 24. For example, a movement of 0.5 mm by the actuator results in a plate movement of 12 microns.

Figure 7A:
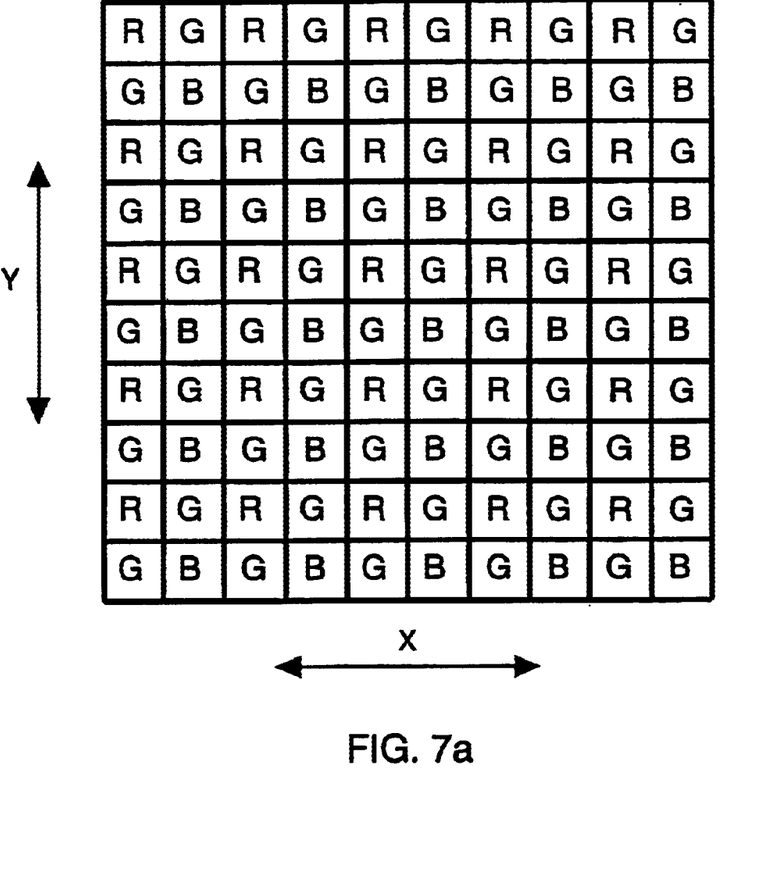
FIG. 7A schematically illustrates the preferred mode of pixel arrangement of a color CCD sensor, to produce optimal sampling resolution according to the sampling method of the present invention.
Figure 7B:
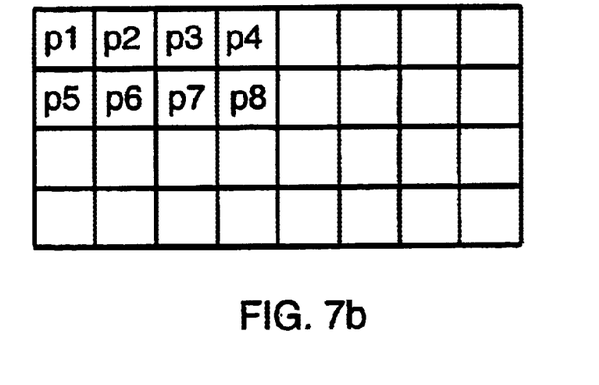
FIG. 7B schematically illustrates the picture elements being sampled by the CCD elements of FIG. 7A.

Reference is now made to FIGS. 7A and 7B, schematically illustrating the preferred mode of pixel arrangement of a color CCD sensor, to produce optimal sampling resolution according to the sampling method of the present invention (FIG. 7A), and the picture elements being sampled by said CCD elements (FIG. 7B).

Figure 5:
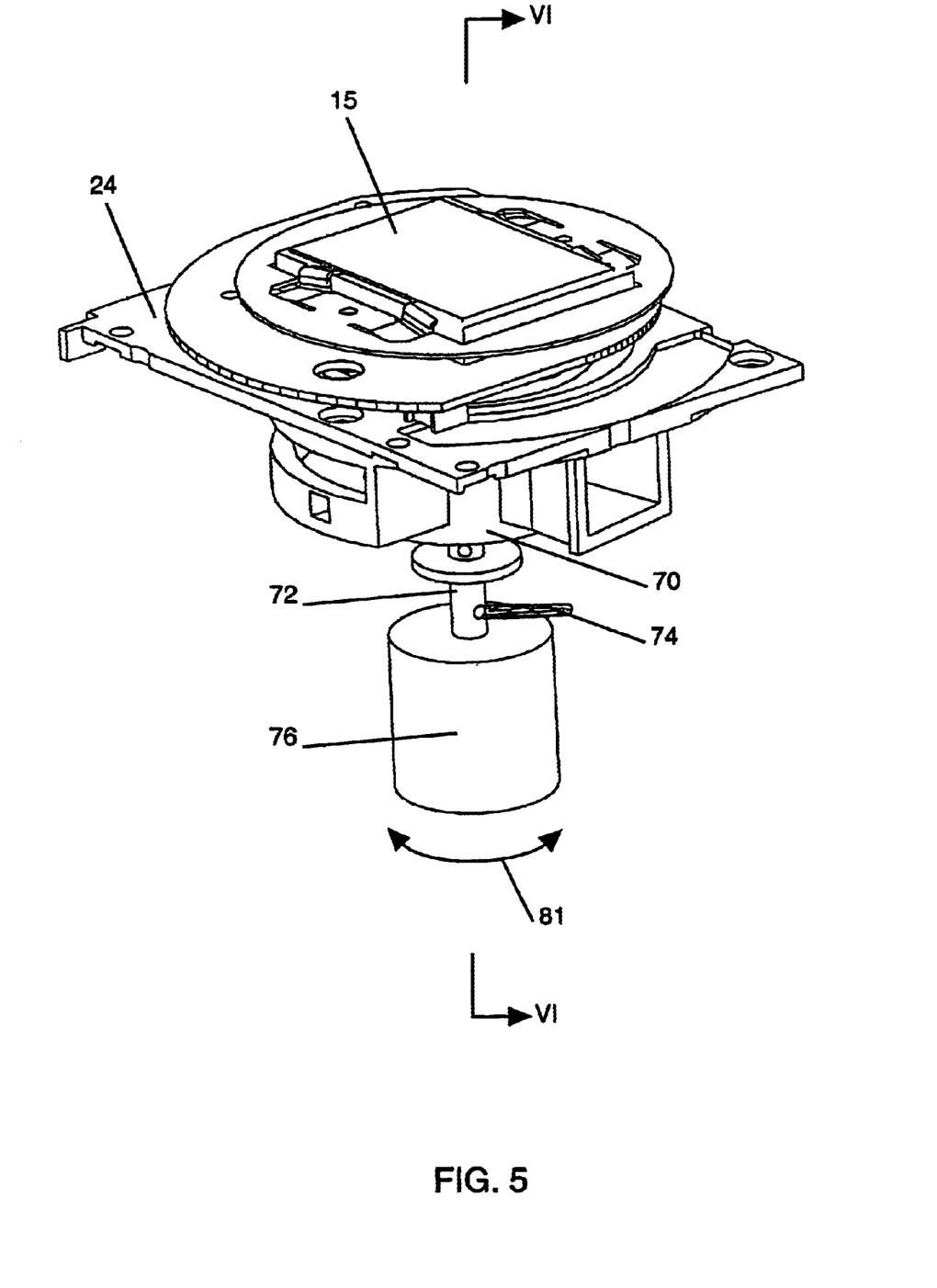
FIG. 5 is an isometric view of a rotatable mount, constructed and operative according to a preferred embodiment of the present invention.
Figure 6:
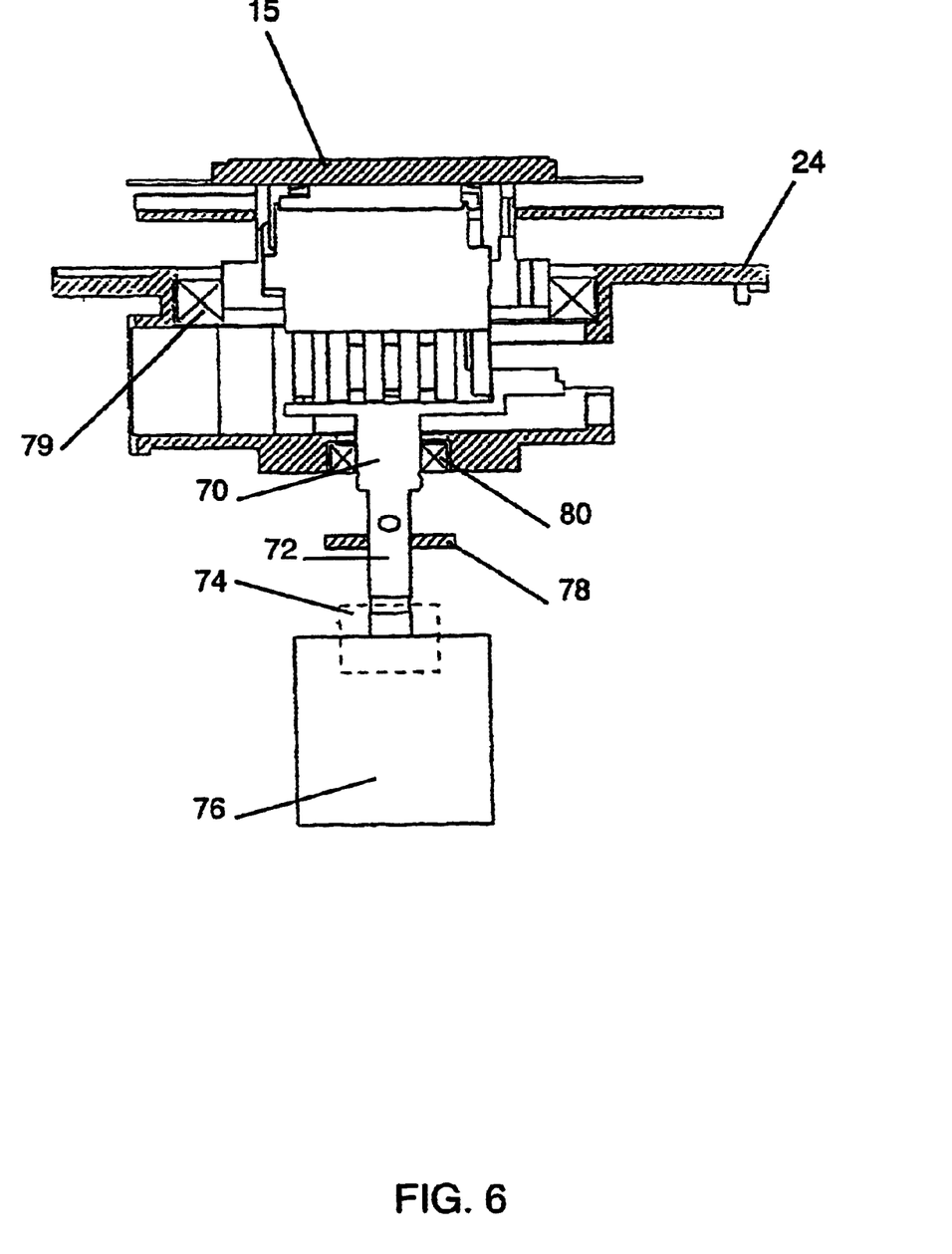
FIG. 6 is a sectional view of the rotatable mount of FIG. 5, taken along lines VI—VI.

The sampling process according to the present invention, enabled by the X-Y movement of the CCD plate as described in conjunction with FIGS. 4, 5 and 6, is performed in three stages, so that each pixel of the captured object is sampled through three filters, two of which may be the same color.

The process will now be explained in details by use of the following example:

In FIG. 7B, some of the captured objects' pixels are numbered p1 to p8 for further reference. Let's assume that before starting the capture process, the light reflected from (or passed through) pixel p1 falls on the top-left pixel of the CCD array, and so forth.

After the first capture, the following information will have been sampled in reference to pixels p1 to p8:

R(p1), G(p2), R(p3), G(p4), G(p5), B(p6), G(p7), B(p8).

Now the CCD is moved along, say, the X-axis, a distance that is equal to the size of one CCD cell in the direction of the movement, and a second capture is taken.

After the second capture, the following information will have been sampled in reference to pixels p1 to p8:

RG(p1), RG(p2), RG(p3), RG(p4), GB(p5), GB(p6), GB(p7), GB(p8).

Now the CCD is moved along the same, say, X-axis, back to its original home position.

In the third stage, the CCD is moved along the perpendicular, say, Y axis a distance that is equal to the size of one CCD cell in the direction of the movement, and a third capture is taken.

After the third capture, the following information will have been sampled in reference to pixels p1 to p8:

RGG(p1), RGB(p2), RGG(p3), RGB(p4), RGB(p5), GGB(p6), RGB(p7), GGB(p8).

At the end of the capturing process, half of the pixels have full color information (RGB) and the other half only have information from two of the color channels.

If we look at behavior of the CCD array along the time axis, we get the following pattern (e.g. for pixel p2):

| Capture | Move | Capture | Move | No Capture | Move | Capture | Move |
|---------|------|---------|------|------------|------|---------|------|
| Green   | X+   | Red     | X−   |            | Y+   | Blue    | Y−   |
| | | | | | | | Time |

It will be appreciated by persons skilled in the art, that the geometrical arrangement of the CFA (color filter array) of the CCD sensor, as shown in FIG. 7A, having a high resolution of G (green) pixels and a lower resolution of R (red) and B (blue) pixels, known as the "Bayer" pattern, combined with the sampling method of the present invention, provide for the best combination of image quality when both modes of one-shot and three-shot captures are required.

If only the three-shot capture mode is required, it is evident that a CFA arrangement as described in FIG. 1, in conjunction with the movement pattern of the present invention, would result in capturing the full color resolution for each pixel, thus providing the best result.

However, when a one-shot mode is also to be supported, having a higher resolution in one of the channels, as shown in FIG. 7A for the Green channel, is advantageous, as will be demonstrated by the following example:

In a homogeneous hue area with fine detail, the higher resolution channel will capture detail that is missed by lower resolution channels; In order to reconstruct the missing color data, interpolation is first done on the data of the high-resolution channel, and then the other missing channels are interpolated at each pixel location, by assuming color constancy over local areas.

In the case of equal resolution channels, as shown in FIG. 1, the finer detail cannot be captured by any interpolation method because of lack of sufficient sampling resolution.

Reference is now made to FIGS. 5 and 6. FIG. 5 is an isometric view of a rotatable mount, constructed and operative according to a preferred embodiment of the present invention and FIG. 6 is a sectional view of the rotatable mount of FIG. 5.

Rotatable mount 70 is connected by means of a shaft 72 extending below the base plate 22 to a manual lever 74. In an alternative embodiment, a motor 76 can be attached to the shaft 72.

The rotatable mount 70 is held within the CCD plate 24 by means of a plurality of bearings 78, 79 allowing the CCD plate 24 to rotate within a predetermined degree of limitation, preferably 90 degrees (indicated by reference 81. A friction ring 80, suitably attached to shaft 72, retains rotatable mount 70 in place.

CCD plate 24 can be actuated (either manually by lever 74 or by motor 76) to rotate through 90 degrees from a first position (say portrait mode) to a second position (say landscape mode) at right angles to the first position. In contrast to the prior art, there is not need to rotated the camera base. Thus, the misalignment of the camera is avoided and it is no longer necessary to re-adjusting the camera stand.

It will be appreciated that the present invention is not limited by what has been described hereinabove and that numerous modifications, all of which fall within the scope of the present invention, exist. Rather the scope of the invention is defined by the claims which follow:

What is claimed is:

1. Apparatus for the orthogonal (X,Y) movement of a CCD sensor within a digital camera body, said apparatus comprising:
   a CCD plate to which the CCD sensor is connected;
   a linear actuator for providing movement in orthogonal X,Y directions to said CCD plate, said linear actuator having a first axis disposed at 45 degrees to said X and Y directions;
   means for transferring movement between said linear actuator and said CCD plates said means for transferring movement comprising:
      a movable member attached to said linear actuator, the actuation of said linear actuator causing said movable member to move either backwards or forwards along said first axis;
      first and second rotatable eccentric arms supported by corresponding first and second support rods, respectively, said first and second rotatable eccentric arms being in contact with said CCD plate; and
      first and second rods, each of said first and second rods having a proximate and a distal end, wherein the distal end of each of said first and second rods is attached to said first and second eccentric arms, respectively, wherein the proximal end of each of said first and second rods is in contact with said movable member, and wherein the proximal end of each of said first and second rods is slidably retained by said base plate.

2. Apparatus according to claim 1 and wherein said means for transferring movement further comprises:
   rotatable annuluses fitted to said first and second eccentric arms; and
   rotating bearings attached to said CCD plate, said rotating bearings in contiguous contact with said rotatable annuluses to reduce friction between said first and second eccentric arms and said CCD plate.

3. Apparatus according to claim 1 and wherein said first and second rods are in contiguous contact with opposite ends of said movable member; said first rod being positioned behind said movable member proximate to one end of said movable member, and said second rod being positioned in front of said movable member proximate to the other end of said movable member.

4. Apparatus according to claim 1 and further comprising:
   first and second restraining plates; each of said first and second restraining plates being attached at a first end to said base plate;
   first and second springs attached to said CCD plate and said first and second restraining plates, and
   wherein said first restraining plate and said first springs act together to resist movement in said "X"-direction and said second restraining plate and said second springs act together to resist movement in said "Y"-direction.

5. Apparatus for the orthogonal (X,Y) movement of a CCD sensor within a digital camera body, said apparatus comprising:
   a CCD plate to which the CCD sensor is connected;
   a linear actuator for providing movement in orthogonal X,Y directions to said CCD plate, said linear actuator having a first axis disposed at 45 degrees to said X and Y directions;
   means for transferring movement between said linear actuator and said CCD plate;
   a rotatable mount supported by said CCD plate;
   a shaft connected to said rotatable mount; and
   adjustment means attached to said shaft for rotating said CCD plate within a pre-determined degree of limitation from a first position to a second position.

6. Apparatus according to claim 5 wherein said first position and said second position are perpendicular to each other.

7. Apparatus according to claim 5 wherein said rotatable mount is supported by means of a plurality of bearings.

8. Apparatus according to claim 5 and further comprising a friction ring attached to said shaft for retaining said rotatable mount in position.

9. Apparatus according to claim 5 and wherein said adjustment means may be operated manually via a lever attached to said shaft or by motorized means.

10. A rotatable mount for rotating a CCD sensor within a pre-determined degree of limitation from a first position to a second positions said apparatus comprising:

a CCD plate for retaining said CCD sensor;

a shaft connected to said rotatable mount;

adjustment means attached to said shaft for rotating said CCD plate; and a friction ring attached to said shaft for retaining said rotatable mount in position.

11. A rotatable mount for rotating a CCD sensor within a pre-determined degree of limitation from a first position to a second position, said apparatus comprising:

a CCD plate for retaining said CCD sensor;

a shaft connected to said rotatable mount;

adjustment means attached to said shaft for rotating said CCD plate; and wherein said adjustment means may be operated manually via a lever attached to said shaft or by motorized means.

* * * * *